United States Patent
Cassoli et al.

(10) Patent No.: US 11,794,404 B2
(45) Date of Patent: Oct. 24, 2023

(54) OFFSET LAYER SLICING AND OFFSET LAYER FORMING OF VAT PHOTOPOLYMERIZATION ADDITIVE MANUFACTURED PARTS

(71) Applicant: Ford Global Technologies, LLC, Dearborn, MI (US)

(72) Inventors: Matthew Cassoli, Dearborn, MI (US); Giuseppe Domenic Lacaria, Canton, MI (US); Sushmit Chowdhury, Dearborn, MI (US); Ellen Cheng-chi Lee, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 96 days.

(21) Appl. No.: 17/094,658

(22) Filed: Nov. 10, 2020

(65) Prior Publication Data

US 2022/0143903 A1 May 12, 2022

(51) Int. Cl.
*B29C 64/124* (2017.01)
*B33Y 10/00* (2015.01)
*B29C 64/129* (2017.01)
*B33Y 30/00* (2015.01)

(52) U.S. Cl.
CPC .......... *B29C 64/124* (2017.08); *B29C 64/129* (2017.08); *B33Y 10/00* (2014.12); *B33Y 30/00* (2014.12)

(58) Field of Classification Search
CPC ... B29C 64/124; B29C 64/129; B29C 64/135; B29C 64/336; B29C 64/194
See application file for complete search history.

(56) References Cited

U.S. PATENT DOCUMENTS

| | | | |
|---|---|---|---|
| 6,133,336 A | * | 10/2000 | Popat .................. G03F 7/027 264/494 |
| 9,511,546 B2 | | 12/2016 | Chen et al. |
| 10,214,002 B2 | | 2/2019 | Pang |

(Continued)

OTHER PUBLICATIONS

Cullen, Fabrication of 3D Conjugated Polymer Structures via Vat Polymerization Additive Manufacturing, 2018, pp. i-116, Thesis submitted to the Graduate Program in Mechanical and Materials Engineering via the Electronic Thesis and Dissertation Repository, Scholarship@Western, The University of Western Ontario.

*Primary Examiner* — Jerzi H Moreno Hernandez
(74) *Attorney, Agent, or Firm* — Burris Law, PLLC

(57) ABSTRACT

A method of additive manufacturing a part via vat photopolymerization (VPP) includes irradiating a first material through a first transparent wall of a first material tank and forming a first section of an nth layer of the part on a platform, positioning the platform with the first section of the nth layer in a second material tank with a distance between the first section of the nth layer and a second transparent wall, and irradiating a second material such that a second section of the nth layer of the part is formed on the platform adjacent to the first section of the nth layer. The method repeats forming first and second sections of additional layer until a predetermined number of total layers are formed. Positioning the first and second sections with a distance between the second and first transparent walls, respectively, inhibits crashing during forming of the part.

20 Claims, 8 Drawing Sheets

(56) References Cited

U.S. PATENT DOCUMENTS

| | | | | |
|---|---|---|---|---|
| 2009/0179355 A1* | 7/2009 | Wicker | ................. | B33Y 70/00 |
| | | | | 264/401 |
| 2012/0295077 A1* | 11/2012 | Ficek | ..................... | G03F 7/105 |
| | | | | 264/401 |
| 2015/0140152 A1* | 5/2015 | Chen | ..................... | B29C 64/135 |
| | | | | 425/174.4 |
| 2015/0165695 A1 | 6/2015 | Chen et al. | | |
| 2015/0201500 A1* | 7/2015 | Shinar | .................. | H05K 3/4685 |
| | | | | 425/132 |
| 2016/0346996 A1* | 12/2016 | Hakkaku | ................... | B32B 1/00 |
| 2017/0165916 A1* | 6/2017 | El-Siblani | ............ | B29C 64/124 |
| 2018/0093427 A1* | 4/2018 | Pang | ....................... | B29C 64/241 |
| 2018/0370153 A1* | 12/2018 | Liu | ....................... | B29C 64/124 |
| 2021/0263211 A1* | 8/2021 | Wu | ........................ | B29C 64/124 |
| 2021/0283829 A1* | 9/2021 | Marin-Martinod | ... | B29C 64/236 |
| 2022/0110719 A1* | 4/2022 | Chavez | ................. | B33Y 70/10 |

\* cited by examiner

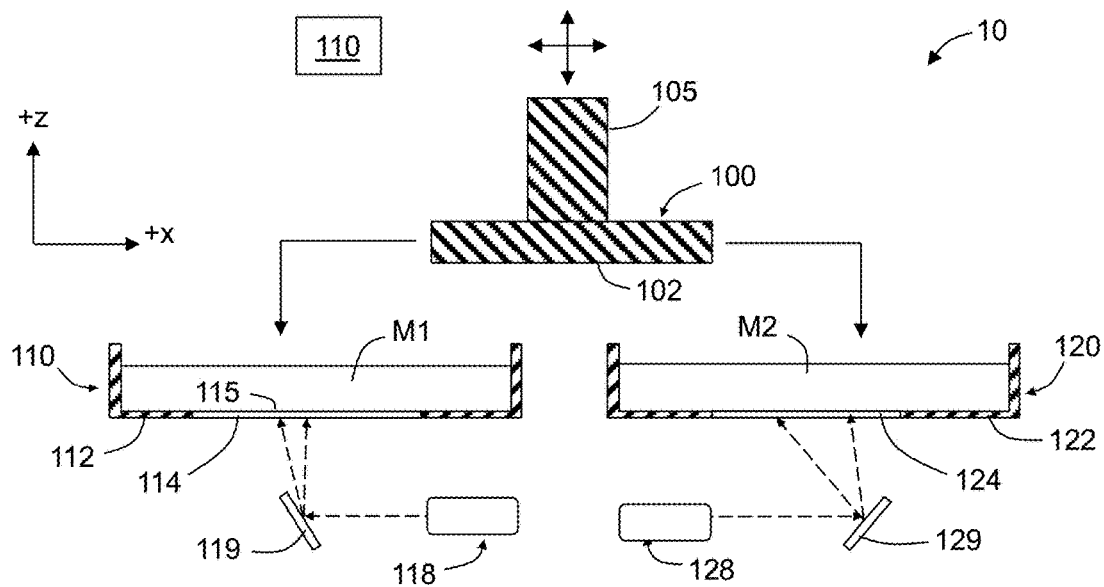
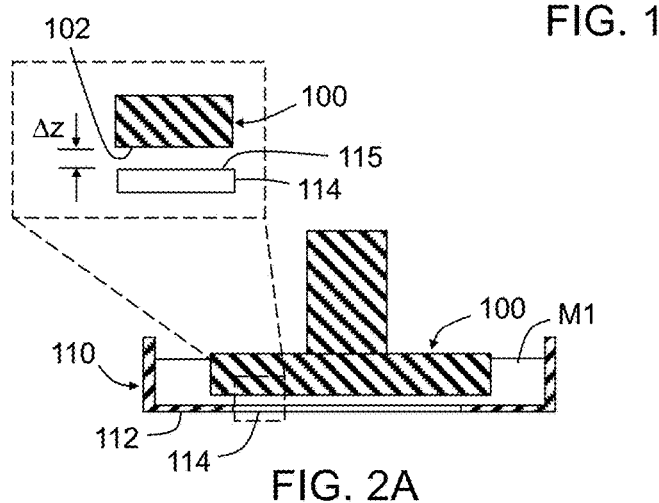
FIG. 2A
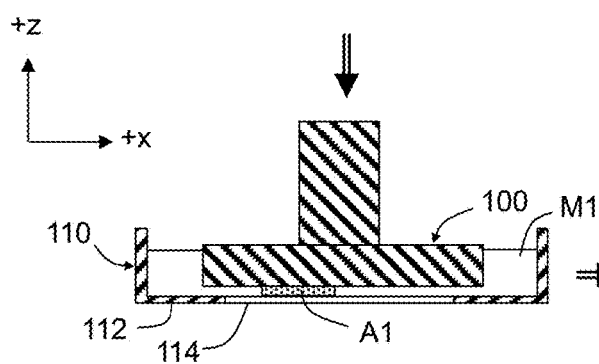
FIG. 2B
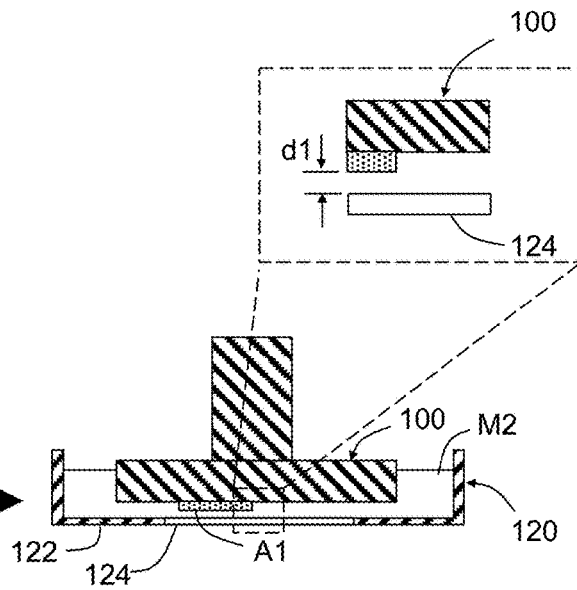
FIG. 2C

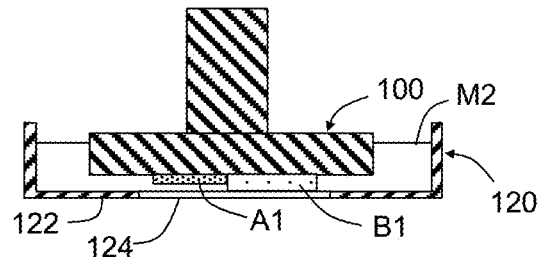
FIG. 2D
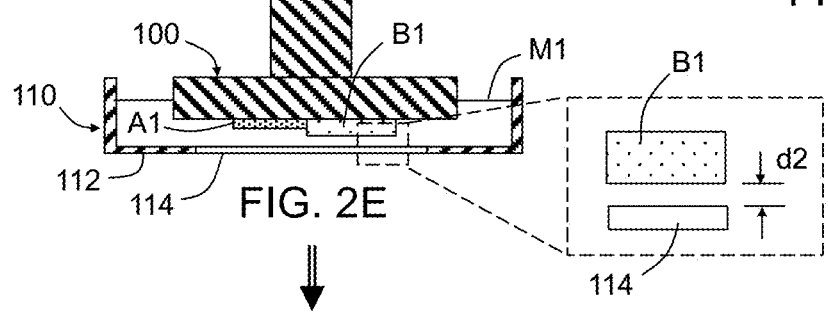
FIG. 2E
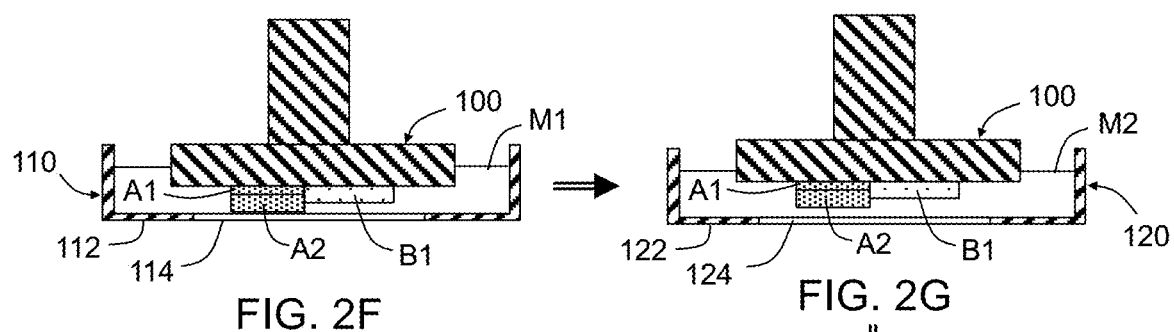
FIG. 2F    FIG. 2G
FIG. 2H
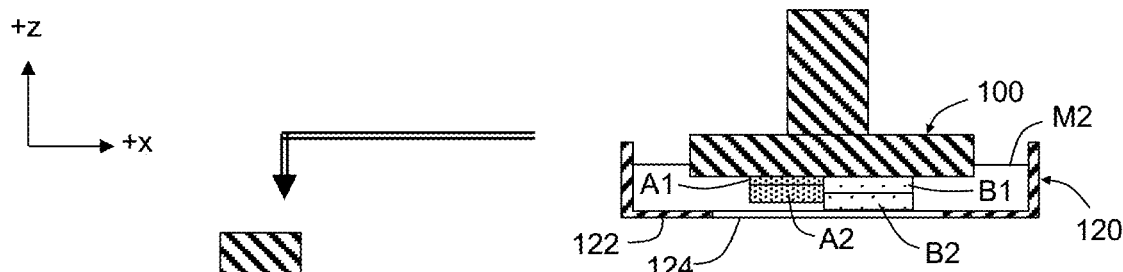
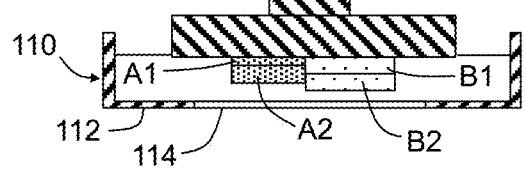
FIG. 2I

OFFSET LAYER SLICING AND OFFSET LAYER FORMING OF VAT PHOTOPOLYMERIZATION ADDITIVE MANUFACTURED PARTS

FIELD

The present disclosure relates to vat photopolymerization additive manufacturing and parts formed using vat photopolymerization.

BACKGROUND

The statements in this section merely provide background information related to the present disclosure and may not constitute prior art.

Traditional vat photopolymerization (VPP) systems, e.g., known stereolithography (SLA) and digital light processing (DLP) systems, form parts from a single material. For example, a vat or tank of a VPP system contains liquid monomers and oligomers that undergo cross-linking when exposed to light to thereby form a polymer layer. Also, replacing the material in the vat or tank in order to form layers or sections from different materials is cost and time prohibitive.

The present disclosure addresses the issues of forming VPP additive manufactured parts using different materials among other issues related to forming VPP additive manufactured parts.

SUMMARY

This section provides a general summary of the disclosure and is not a comprehensive disclosure of its full scope or all of its features.

In one form of the present disclosure, a method of additive manufacturing a part via vat photopolymerization (VPP) includes irradiating a first material through a first transparent wall of a first material tank and forming a first section of an nth layer of the part on a platform, where n=1, 2, 3 . . . f and f=a predefined number of total layers (step a), and positioning the first section of the nth layer in a second material tank with a distance between the first section of the nth layer and a second transparent wall (step b). A second material between the platform and the second transparent wall is irradiated and a second section of the nth layer of the part is formed adjacent to the first section of the nth layer (step c). The layer number (i.e., n) is incremented by one and the platform with the second section of the nth layer is positioned in the first material tank with another distance between the second section of the nth layer and the first transparent wall (step d). The method repeats the steps above (i.e., steps a through d) until f layers are formed.

In some variations, the first section of the nth layer is positioned at least 10 μm from the second transparent wall during forming of the second section of the nth layer and the second section of the nth layer is positioned at least 10 μm from the first transparent wall during forming of the first section of the n+1 layer.

In at least one variation, the method further includes treating the first section of the nth layer before forming the second section of the nth layer and/or treating the second section of the nth layer before forming the first section of the next (i.e., n+1) layer. In such variations, treating the formed first section and/or the formed second section includes at least one of washing, solvent spraying, solvent dunking, wiping, air drying, and blow drying the formed first section and/or the formed second section.

In some variations, the second material has at least one optical property different than the first material. For example, in at least one variation the first sections of the f layers have a first color and the second sections of the f layers have a second color different than the first color. Also, in some variations, the method includes forming a transparent or translucent cover layer over the f layer of the part.

In some variations, the first sections of the f layers are transparent and in at least one variation the part is a light pipe.

In some variations the second material has at least one mechanical property different than the first material. For example, in at least one variation the first sections of the f layers have a first elasticity and the second sections of the f layers have a second elasticity different than the first elasticity.

In some variations the first sections of the f layers have a first conductivity and the second sections of the f layers have a second conductivity different than the first conductivity. For example, in at least one variation the second sections of the f layers are a plurality of dielectric material sections and the part is a capacitor.

In some variations, irradiating the first material through the first transparent wall of the first material tank includes forming at least two first sections of the nth layer spaced apart from each other, and irradiating the second material between the platform and the second transparent wall includes forming the second section of the $n^{th}$ layer between the at least two first sections of the $n^{th}$ layer. And in at least one variation the second sections of the f layers are formed from a transparent material such that the part is light pipe.

In another form of the present disclosure, a method of additive manufacturing a part via VPP includes irradiating a first material through a first transparent wall of a first material tank and forming a first section of an nth layer of the part on a platform, where n=1, 2, 3 . . . f and f=a predefined number of total layers step a). The method further includes positioning the platform with the first section of the nth layer in a second material tank with a distance between the first section of the nth layer and a second transparent wall (step b), and irradiating a second material and forming a second section of the nth layer of the part on the platform adjacent to the first section of the nth layer such the second section of the nth layer has an outer surface offset from an outer surface of the first section of the nth layer (step c). The method includes incrementing the layer number by one (i.e., n=n+1) and positioning the platform with the second section of the nth layer in the first material tank with another distance between the second section of the nth layer and the first transparent wall (step d) and repeating the steps above (i.e., steps a through d) until f layers having first sections and second sections are formed.

In some variations, irradiating the first material through the first transparent wall of the first material tank includes forming at least two first sections of the nth layer spaced apart from each other, and irradiating the second material between the platform and the second transparent wall includes forming the second section of the nth layer between the at least two first sections of the nth layer.

In at least one variation, the first material has at least one property different than the second material and the at least one property is at least one of a chemical property, a physical property, and a mechanical property.

In still another form of the present disclosure, a method of additive manufacturing a part via VPP includes irradiating a first material through a first transparent wall of a first material tank and forming a first section of an nth layer of the part on a platform, where n=1, 2, 3 . . . f and f=a predefined number of total layers (step a). The method includes removing the first section of the nth layer from the first material tank and treating at least the first layer before (step b), and positioning the first section of the nth layer in a second material tank with a distance between the first section of the nth layer and a second transparent wall (step c). The method also includes irradiating a second material in the second material tank and forming a second section of the nth layer of the part on the platform adjacent to the first section of the nth layer such that the second section of the nth layer has a lower surface offset from a lower surface of the first section of the nth layer (step d). The method includes removing the second section of the layer from the second material tank and treating at least the second section of the layer (step e) and incrementing the layer number by one (i.e., n=n+1) and positioning the second section of the nth layer in the first material tank with another distance between the second section of the nth layer and the first transparent wall (step f). The method also includes repeating the above steps (i.e., steps a through f) until f layers are formed.

In some variations, the first material has at least one property different than the second material and the at least one property is at least one of a chemical property, a physical property, and a mechanical property.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a side cross-sectional view of a VPP system according to one form of the present disclosure;

FIG. 2A is the VPP system in FIG. 1 positioning a platform in a first material tank at a distance from a first transparent wall according to the teachings of the present disclosure;

FIG. 2B is the VPP system in FIG. 1 forming a first section of a first layer of a part in the first material tank according to the teachings of the present disclosure;

FIG. 2C is the VPP system in FIG. 1 positioning the platform in a second material tank at another distance from a second transparent wall according to the teachings of the present disclosure;

FIG. 2D is the VPP system in FIG. 1 forming a second section of the first layer of the part in the second material tank according to the teachings of the present disclosure;

FIG. 2E is the VPP system in FIG. 1 positioning the platform in the first material tank at a distance from the first transparent wall according to the teachings of the present disclosure;

FIG. 2F is the VPP system in FIG. 1 forming a first section of a second layer of the part in the first material tank according to the teachings of the present disclosure;

FIG. 2G is the VPP system in FIG. 1 positioning the platform in the second material tank at another distance from the second transparent wall according to the teachings of the present disclosure;

FIG. 2H is the VPP system in FIG. 1 forming a second section of the second layer of the part in the second material tank according to the teachings of the present disclosure;

FIG. 2I is the VPP system in FIG. 1 positioning the platform in the first material tank at a distance from the first transparent wall according to the teachings of the present disclosure;

Figures 2J, 2K:
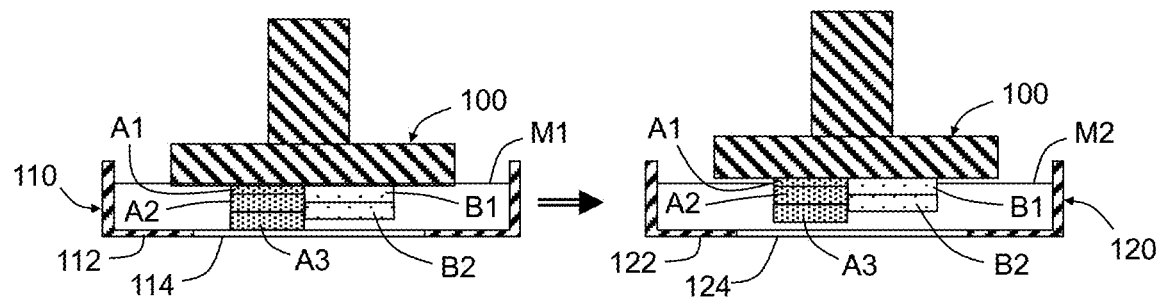
FIG. 2J is the VPP system in FIG. 1 forming a first section of a third layer of the part in the first material tank according to the teachings of the present disclosure.
FIG. 2K is the VPP system in FIG. 1 positioning the platform in the second material tank at another distance from the second transparent wall according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a VPP system 10 according to one form of the present disclosure is shown. The VPP system 10 includes a build platform 100 (simply referred to herein as a "platform") mechanically coupled to a platform elevator 105 configured to move the platform 100 vertically (+/−z direction). In some variations of the present disclosure, the platform elevator 105 is configured to move the platform laterally (+/−x direction) and/or radially (i.e., rotation about the z axis). The VPP system 10 also includes a first material tank 110 containing a first material 'M1' (e.g., a first photopolymer material) and a second material tank 120 containing a second material 'M2' (e.g., a second photopolymer material) different than the first material M1. The first material tank 110 has a first bottom wall 112 and at least a portion of the first bottom wall 112 is a first transparent wall 114. Similarly, the second material tank 120 has a second bottom wall 112 and at least a portion of the second bottom wall 112 is a second transparent wall 114.

The VPP system 10 includes at least one light emitting device with optics configured to irradiate the first material M1 through the first transparent wall 114 and to irradiate the second material M2 through the second transparent wall 124. In the example shown in FIG. 1, the VPP system 10 has a first light emitting device 118 with a mirror 119 configured to irradiate the first material M1 through the first transparent wall 114 and a second light emitting device 128 with a mirror 129 configured to irradiate the second material M2 through the second transparent wall 124. In the alternative, the VPP system has a single light emitting device (e.g., light emitting device 118, light emitting device 128, or a light emitting device not shown) that in combination with the mirror 119 is configured to irradiate the first material M1 through the first transparent wall 114, and in combination with the mirror 129 is configured to irradiate the second material M2 through the second transparent wall 124.

Non-limiting examples of a light emitting device include a laser emitting device and a light projector. For example, in some variations the light emitting device 118 and/or light emitting device 128 is a laser emitting device and the VPP system 10 is an SLA system, while in other variations the light emitting device 118 and/or light emitting device 128 is a light projector and the VPP system 10 is a DLP system. And in at least one variation the VPP system 10 includes a laser emitting device (e.g., light emitting device 118) and a light projector (e.g., light emitting device 128), and the VPP system 10 is a hybrid or combination SLA/DLP system.

It should be understood that light emitting device 118 and/or the light emitting device 128 are/is configured to irradiated predefined sections of the first transparent wall 114 and the second transparent wall 128 such that solid layers having a desired shaped are formed from the first material M1 and the second material M2 on an upper (+z direction) surface of the first transparent wall 114 and the second transparent wall 124.

As used herein, the phrase "different material" or "different materials" refers to at least two materials, that once cured or solidified, have at least one different optical, physical, chemical, and/or mechanical property from each other. Non-limiting examples of optical properties include color, refraction index, polarization, reflectance, absorption, photoluminescence, transmittance, diffraction, dispersion, dichroism, scattering, birefringence, photosensitivity, among others. Non-limiting examples physical properties include melting point, solidification temperature, glass transition temperature, capacitance, electrical conductivity, thermal conductivity, electrical resistance, electrical impedance, inductance, permeability, permittivity, among others. Non-limiting example of mechanical properties include yield strength, tensile strength, ductility, elasticity, among others. And non-limiting examples of chemical compositions include materials such as photopolymers formed from acrylics, polyvinyl alcohol, polyvinyl cinnamate, polyisoprene, polyamides, epoxies, polyimides, styrenic block copolymers, nitrile rubber, among others. In addition, the photopolymers may or may not contain electrically conductive and/or non-conductive fillers, fibers, particles, additives, among others.

Referring to FIGS. 2A-2K, a non-limiting example of steps for forming an additive manufactured part using the VPP system 10 according to the teachings of the present disclosure is shown. Particularly, in FIG. 2A the platform 100 is positioned in the first material tank 110 with a gap 'Δz' between a lower surface 102 of the platform 100 and an upper surface 115 of the first transparent wall 114 such that the first material M1 is between the platform 100 and the first transparent wall 114. In some variations, the elevator 105 is configured to move (i.e., lower (−z direction)) the platform 100 into the first material tank 110 until the platform 100 is located with the gap Δz between the lower surface 102 of the platform 100 and the upper surface 115 of the first transparent wall 114. In other variations, the first material tank 110 is configured to move until the platform 100 is located with the gap Δz between the lower surface 102 of the platform 100 and the upper surface 115 of the first transparent wall 114. And in at least one variation both the elevator 105 and the first material tank 110 are configured to move until the platform 100 is located with the gap Δz between the lower surface 102 of the platform 100 and the upper surface 115 of the first transparent wall 114. In some variations the gap Δz and other gaps disclosed herein is between 5 micrometers (μm) and 200 μm, for example between 5 μm and 150 μm, between 10 μm and 100 μm, between 15 μm and 75 μm, or between 15 μm and 50 μm.

In FIG. 2B the light emitting device 118 (FIG. 2A) has irradiated the first material M1 between the platform 100 and the first transparent wall 114 such that the first material M1 has solidified and formed a first section 'A1' on the platform 100 with a thickness (z direction) generally equal to the thickness of the gap Δz. As used herein, the capital letter 'A' in 'A1', and other capital letters in two digit capital letter-number characters shown in the figures, refers to a number of a section in a given layer, and the number '1' in 'A1', and other numbers in two digit capital letter-number characters shown in the figures, refers to a number of the given layer. For example, A1 refers to a first section of a first layer, B1 refers to a second section of a first layer, C5 refers to a third section of a fifth layer, and the like.

In FIG. 2C the first section A1 is positioned in the second material tank 120 with a distance 'd1' between a lower (−z direction) surface of the first section A1 and the second transparent wall 124. In some variations, the elevator 105 is configured to move (i.e., lower (−z direction)) the platform 100 until the lower surface of the first section A1 is at the distance d1 from the second transparent wall 114 as shown in FIG. 2C. In other variations, the second material tank 120 is configured to move until the lower surface of the first section A1 is at the distance d1 from the second transparent wall 114. And in at least one variation both the elevator 105 and the second material tank 110 are configured to move until the lower surface of the first section A1 is at the distance d1 from the second transparent wall 114. In some variations the distance d1 is between 10 micrometers (μm) and 100 μm, for example between 5 μm and 75 μm, between 10 μm and 75 μm, between 15 μm and 65 μm, or between 20 μm and 60 μm.

In FIG. 2D the light emitting device 128 (FIG. 2A) has irradiated the second material M2 between the platform 100 and the second transparent wall 124 such that the second material M2 has solidified and formed a second section of the first layer 'B1' on the platform 100. It should be understood that positioning the platform 100 in the second material tank 120 at the distance d1 between the lower surface of the first section A1 and the second transparent wall 124 inhibits crashing between the first section A1 and the second transparent wall 124, and results in the second section B1 having a lower surface that is offset (i.e., lower (−z direction)) than a lower surface of the first section A1. Stated differently, the first layer is sliced into or formed from the two offset sections A1 and B1. As used herein, the term "crash" or "crashing" refers to impact between a lower (−z direction) surface a formed section with a transparent wall during positioning of the section in a material tank to form the next section. It should be understood that crashing can result in damage to and scrapping of the part being formed.

In FIG. 2E the platform 100 with the first section A1 and the second section B1 is positioned in the first material tank 110 with another distance d2 between the second section B1 (i.e., the lower surface of the second section B1) and the first transparent wall 114. In some variations the distance d2 is equal to the distance d1, while in other variations the distance d2 is not equal to the distance d1. Non-limiting examples of the distance d2 includes distances between 10 micrometers (μm) and 100 μm, for example between 5 μm and 75 μm, between 10 μm and 75 μm, between 15 μm and 65 μm, or between 20 μm and 60 μm.

In FIG. 2F the light emitting device 118 (FIG. 2A) has irradiated the first material M1 between the first section A1 and the first transparent wall 114 such that the first material M1 has solidified and formed a first section of a second layer 'A2' on the first section A1 and adjacent to the second section B1. It should be understood that positioning the platform 100 in the first material tank 110 at the other distance d2 between the second section B1 and the first transparent wall 114 inhibits impact (crashing) between the second section B1 and the first transparent wall 114, and results in the first section A2 having a lower surface that is offset (i.e., lower (−z direction)) than the lower surface of the second section B1.

In FIG. 2G the second section B1 and the first section A2 are positioned in the second material tank 120 with a distance (not labeled in FIG. 2G) between the first section A2 and the second transparent wall 124. In some variations the distance is equal to the distance d1, while in other variations the distance is greater than or less than the distance d1. Referring to FIG. 2H, the light emitting device 128 (FIG. 2A) has irradiated the second material M2 between the second section B1 and the second transparent wall 124 such that the second material M2 has solidified and formed a second section of the second layer 'B2' on the second section B1 and adjacent to the first section A2. It should be understood that positioning the platform 100 in the second material tank 120 with the distance d2 between the second section B1 and the second transparent wall 124 inhibits crashing between the first section A2 and the second transparent wall 124, and results in the second section B2 having a lower surface that is offset (i.e., lower (−z direction)) from the lower surface of the first section A2. Stated differently, the second layer is sliced into or formed from the two offset sections A2 and B2.

In FIG. 2I the first section A2 and the second section B2 are positioned in the first material tank 110 with another distance between the second section B2 and the first transparent wall 114. In some variations the distance is equal to the distance d1, while in other variations the distance is greater than or less than the distance d1. FIG. 2J illustrates the light emitting device 118 (FIG. 2A) having irradiated the first material M1 between the first section A2 and the first transparent wall 114 such that the first material M1 has solidified and formed a first section of a third layer 'A3' on the first section A2 and adjacent to the second section B2. It should be understood that positioning the platform 100 in the first material tank 110 with the distance between the first section A2 and the first transparent wall 114 inhibits crashing between the second section B2 and the first transparent wall 114, and results in the first section A3 having a lower surface that is offset (i.e., lower (−z direction)) from the lower surface of the second section B2.

Figure 2L:
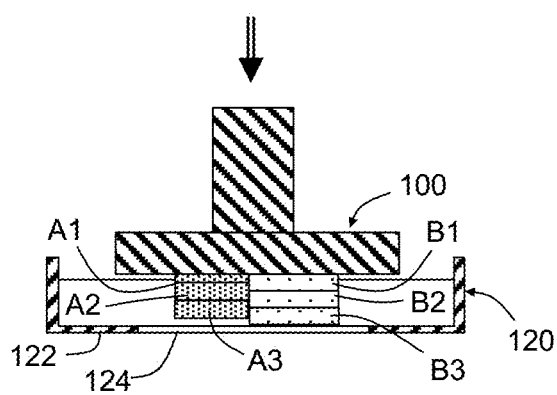
FIG. 2L is the VPP system in FIG. 1 forming a second section of the third layer of the part in the second material tank according to the teachings of the present disclosure.

In FIG. 2K, at least the first section A3, and the second section B2 are positioned in the second material tank 120 with a distance between the first section A3 and the second transparent wall 124. In some variations the distance is equal to the distance d1, while in other variations the distance is greater than or less than the distance d1. And FIG. 2L illustrates the light emitting device 128 (FIG. 2A) having irradiated the second material M2 between the second section B2 and the second transparent wall 124 such that the second material M2 has solidified and formed a second section of the third layer 'B3' on the second section B2 and adjacent to the first section A3. It should be understood that positioning the platform 100 in the second material tank 120 with the distance between the first section A3 and the second transparent wall 124 inhibits crashing between the first section A3 and the second transparent wall 124, and results in the second section B3 having a lower surface that is offset (i.e., lower (−z direction)) from a lower surface of the first section A3. Stated differently, the third layer is sliced into or formed from the two offset sections A3 and B3.

Figure 3:
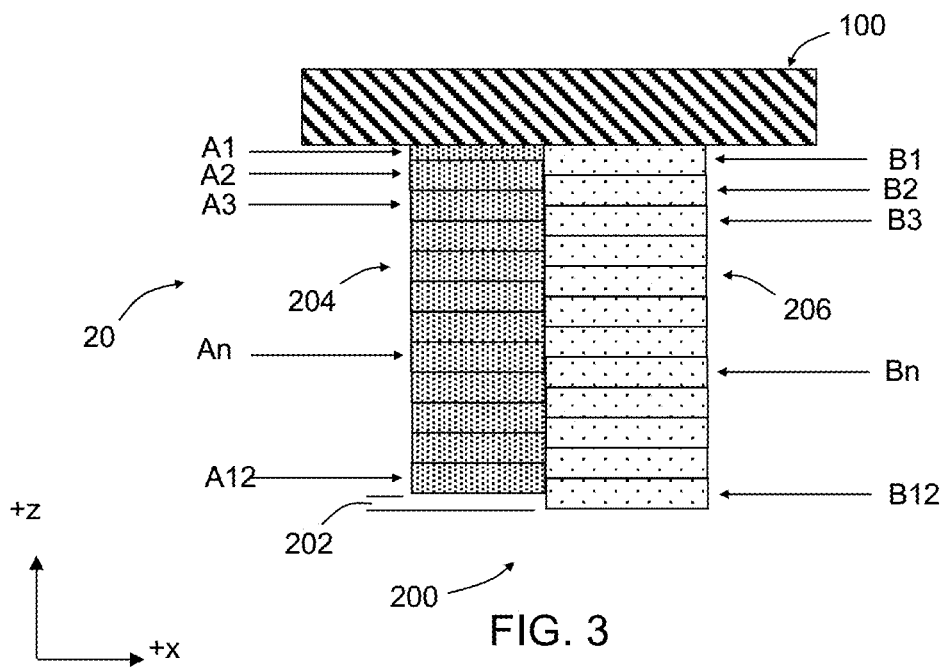
FIG. 3 is a side cross-section view of a part with f total layers according to the teachings of the present disclosure.

The process or method continues until a part with a desired number of layers formed from offset first and second sections is additively manufactured. For example, FIG. 3 shows a part 20 having twelve (12) layers with twelve first sections (i.e., A1, A2, A3, . . . Af where f=total number of layers=12) and twelve second sections (i.e., B1, B2, B3, . . . f). And as shown in FIG. 3, each of the 'n' layers is sliced into or formed from two offset sections An and Bn. It should be understood that positioning the platform 100 such that a distance is between the last formed section and a given transparent wall inhibits crashing between the last formed section and the transparent wall. That is, executing an offset layer slicing strategy or design as described above inhibits crashing during VPP additive manufacturing of parts formed from different materials.

In some variations, the total number layers of a part (e.g., n=f) is greater than 50, 100, 250, 500, 1,000, 5,000, 10,000, 25,000, 50,000, or more. Accordingly, the method according to the teachings of the present disclosure inhibits tens, hundreds, thousands and/or tens of thousands of potential crash events.

Figures 4A, 4B:
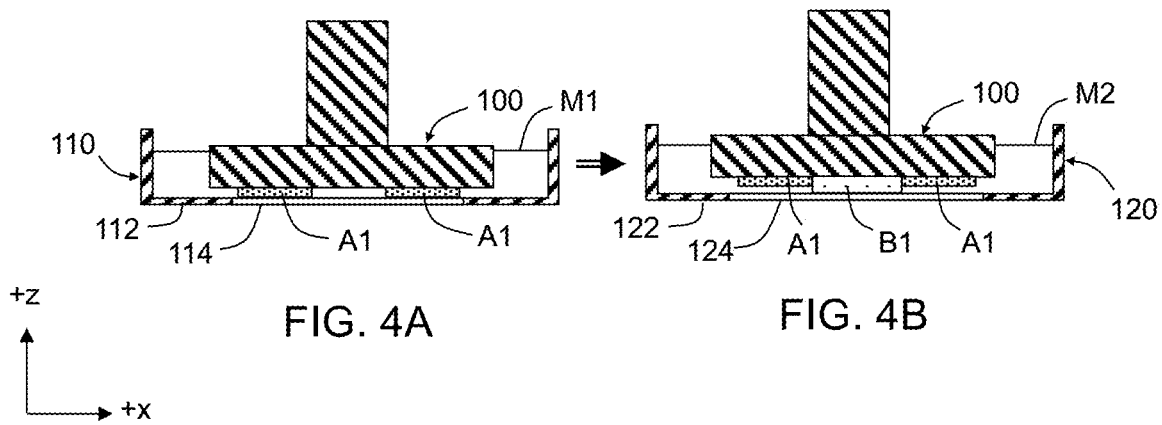
FIG. 4A is the VPP system in FIG. 1 forming a pair of first sections of a first layer of a part in a first material tank according to the teachings of the present disclosure.
FIG. 4B is the VPP system in FIG. 1 forming a second section of the first layer of the part in a second material tank according to the teachings of the present disclosure.
Figure 5:
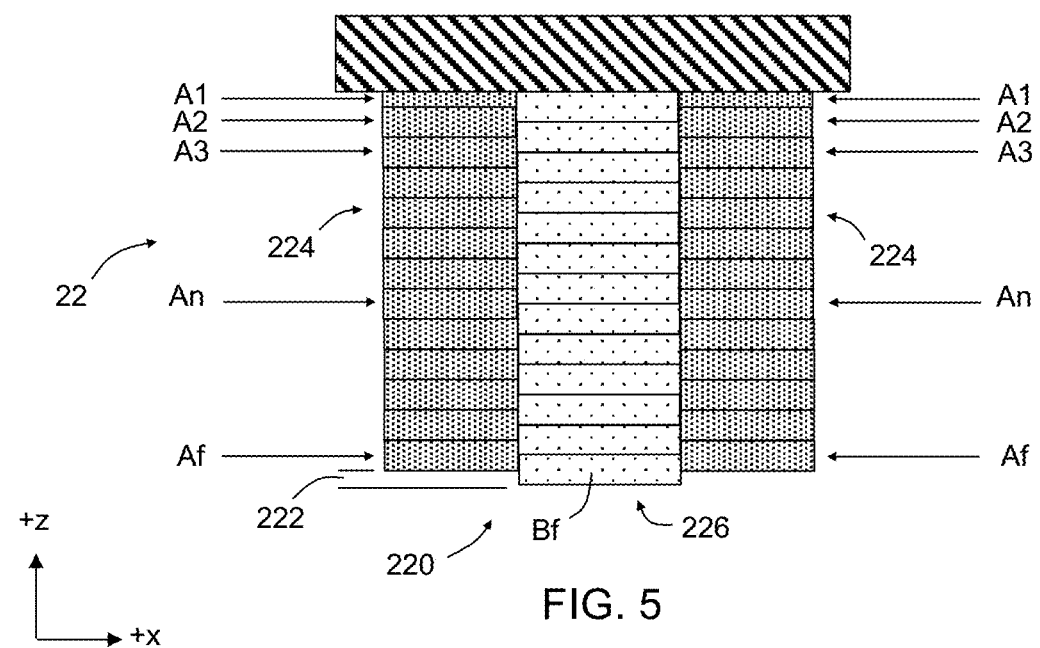
FIG. 5 is a side cross-section view of another part with f total layers according to the teachings of the present disclosure.

While part 20 shown in FIG. 3 has one column 204 of first sections A1, A2, A3, . . . Af and one column 206 of second sections B1, B2, B3, . . . Bf, in some variations the VPP system 10 is used to form parts with more than two columns. For example, and with reference to FIGS. 4A-4B and FIG. 5, FIG. 4A shows the platform 100 positioned in the first material tank 110 with a gap (e.g., Δz (see FIG. 2A)) between the platform 100 and the first transparent wall 114 and the light emitting device 118 (FIG. 2A) having irradiated the first material M1 between the platform 100 and the first transparent wall 114 such that the first material M1 has solidified and formed two first sections A1 spaced apart from each other. FIG. 4B shows the two first sections A1 positioned in the second material tank 120 with a distance between the two first sections A1 and the second transparent wall 124, and the light emitting device 128 (FIG. 2A) having irradiated the second material M2 between the platform 100 and the second transparent wall 124 such that the second material M1 has solidified and formed a second section B1 offset and between the pair of spaced apart first sections A1. And FIG. 5 shows a part 22 with two columns 224 of first sections A1, A2, A3, . . . Af and a column 226 of second sections B1, B2, B3, Bf. Accordingly, it should be understood that parts with layers having two or more sections formed from different materials are provided according to the teachings of the present disclosure.

Figure 6:
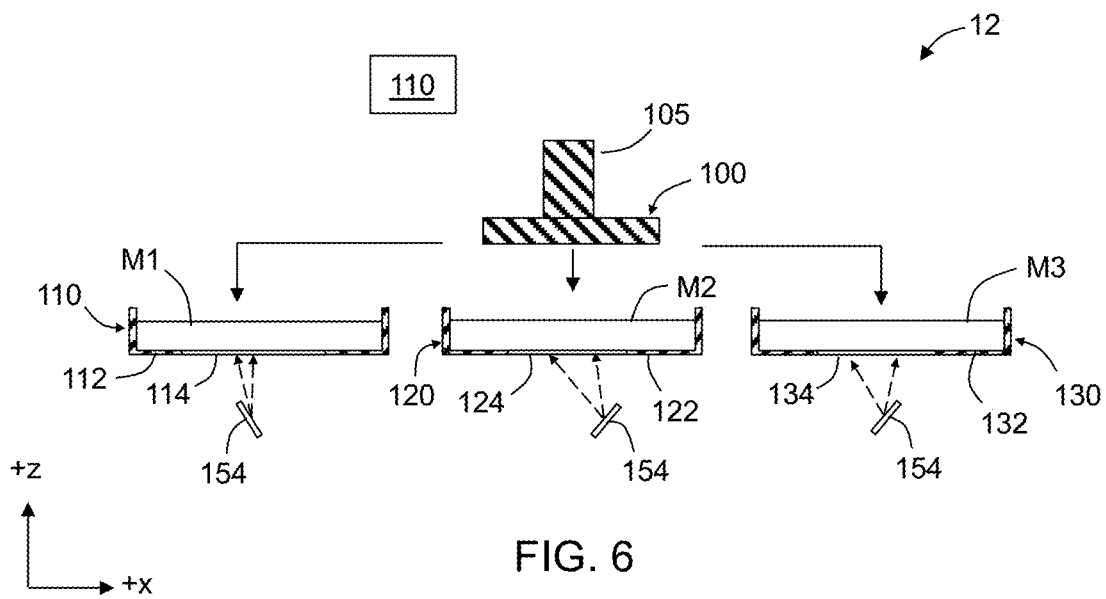
FIG. 6 is a side cross-sectional view of a VPP system according to another form of the present disclosure.

Referring now to FIG. 6, a VPP system 12 according to another form of the present disclosure is shown. The VPP system 12 includes the platform 100 mechanically coupled to the platform elevator 105, the first material tank 110 containing the first material M1, the second material tank 120 containing the second material M2, and a third material tank 130 containing a third material 'M3'. Similar to the first material tank 110 and the second material tank 120, the third material tank 130 has a third bottom wall 132 and at least a portion of the third bottom wall 132 is a third transparent wall 134. Also, the VPP system 12 has a light emitting device (not shown) configured to irradiate the third material M3 through the third transparent wall 134. Accordingly, the VPP system 12 is configured to form a part using three materials.

Figure 7:
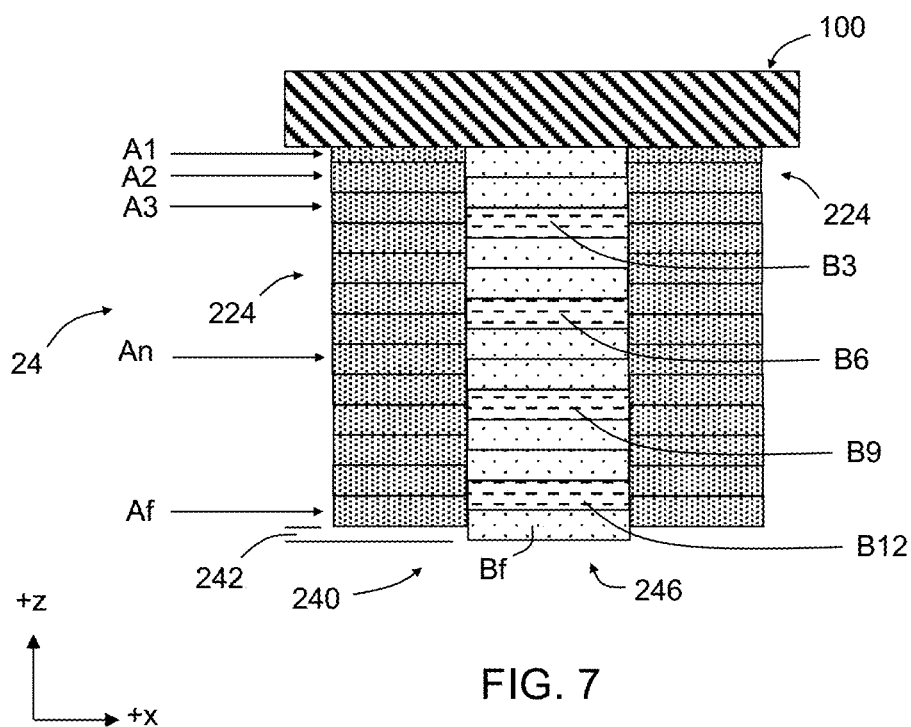
FIG. 7 is a side cross-section view of still another part with f total layers according to the teachings of the present disclosure.

For example, and with reference to FIG. 7, a part 24 formed with the VPP system 12 is shown. The part 24 is formed using the method or steps discussed above with respect to FIGS. 2A-2L and 4A-4B and has two columns 244 of first sections A1, A2, A3, . . . Af and one column 246 of second sections B1, B2, B3, . . . Bf. However, and unlike part 22, the column 246 includes second sections B3, B6, B9, and B12 formed from the third material M3. That is, after forming the pair of first sections A3 in the first material tank 110, at least the two first sections A3 and the second section B2 are positioned in the third material tank 130 with a distance between the two first sections A3 and the third transparent wall 134. And as described above with respect to FIGS. 2K-2L, a light emitting device irradiates the third material M3 between the second section B2 and the third transparent wall 134 such that the third material M3 solidifies and forms a second section B3 on the second section B2 and adjacent/between the two first sections A3. It should be understood that positioning the two first sections A3 in the third material tank 130 with the distance between the two first sections A3 and the third transparent wall 134 inhibits crashing between the two first sections A3 and the third transparent wall 134, and results in the second section B3 having a lower surface that is offset (i.e., lower (−z direction)) than a lower surface of the two first sections A3. Stated differently, the third layer is sliced into or formed from the offset sections A3 and B3.

Similarly, after forming the pair of first sections A6 in the first material tank 110, at least the two first sections A6 and the second section B5 are positioned in the third material tank 130 with a distance between the second section B5 and the third transparent wall 134. Then the light emitting device irradiates the third material M3 between the second section B5 and the third transparent wall 134 such that the third material M3 solidifies and forms a second section B6 on the second section B5 and adjacent/between the two first sections A6.

The same steps repeat for forming the second sections B6, B9 and B12 out of the third material M3 until the part 24 with f total layers is formed. Accordingly, a method of forming parts out of at least three different materials using VPP to additively manufacture the parts is provided.

Accordingly, parts formed according to the teachings of the present disclosure have enhanced properties and features compared to parts formed from a single material and/or a unique combination of properties compared to parts formed from a single material. In addition, such parts are additively manufactured (particularly via VPP) with a decreased probability of crashing during manufacture and thereby additively manufactured with a reduction in cost and/or time.

One non-limiting example of such a part is provided from the column 226 of part 22 in FIG. 5 formed from a transparent material and the columns 224 formed from an opaque or reflective material such that the part 22 is a light pipe configured for light to propagate through the column 226 (z direction) between the columns 224. Another non-limiting example of such a part is provided from the column 226 of part 22 in FIG. 5 formed from a dielectric material and the columns 224 formed from a conductive material such that the part 22 is a configured to operate as a capacitor. In addition, modification of the second sections B1-Bf in column 246 as discussed for part 24 in FIG. 7 provides for enhancement or tuning of a desired property of the column 246 and the part 24. Other non-limiting examples of such parts include bumpers (i.e., components that absorb mechanical energy), resistors, cushions and/or pads with stiff areas or sections soft areas or sections, pads disposed between components such that the pad(s) tunes the natural frequency of the adjacent components and thereby enhances noise, vibration and harshness (NVH) properties of the components, parts with enhanced hardness and/or scratch resistant areas or sections, sensors and/or switches disposed in or on cushion components such as seats, sensors and/or switches disposed in or on a hub of a steering wheel, among others.

As shown in FIGS. 3, 5, and 7, in some variations a final layer of part has a lower surface with a step or an offset between sections formed from different materials. In some variations such a step or offset is acceptable for a part. For example, such a step or steps of a final layer located along a curvature or curved surface of the part may be desired. In another example, such a step or steps of a final layer along a planar section on the part may be desired or may be acceptable. However, in variations where such a step or steps of a final layer is not desired, the present disclosure provides for a smooth final layer, i.e., a final or cover layer without a lower or outer surface having a step or steps.

Figure 8:
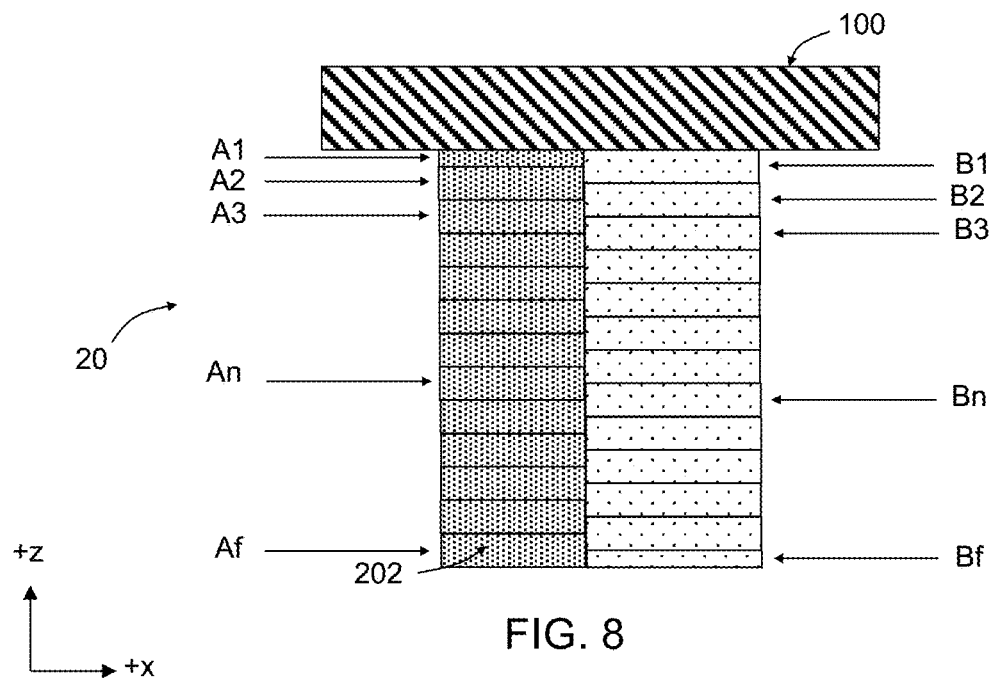
FIG. 8 is a side cross-section view of still yet another part with f total layers according to the teachings of the present disclosure.

For example, and with reference to FIG. 8, the final second section Bf has reduced thickness such that a lower surface (−z direction) of the second section Bf is generally even or level with a lower surface (−z direction) of the first section Af. It should be understood that during forming of the second section Bf a lower surface of the Af section is in close proximity to (e.g., in contact with) the second transparent surface 124 while the light emitting device 128 (FIG. 2A) irradiates the second material M2 between the second section B(f−1) and the second transparent wall 124. It should also be understood that positioning the platform 100 in the second material tank 120 with the lower surface of the Af section in close proximity to (e.g., in contact with) the second transparent surface 124 can result in a crash between the first section Af and the second transparent wall 124. However, the possibility of a single crash event (i.e., crashing of the first section Af) compared to the possibility of hundreds or thousands of crash events during additive manufacturing a part using conventional methods provides an improved method for making the part 20 with a smooth or planar lower surface 200.

Figure 9:
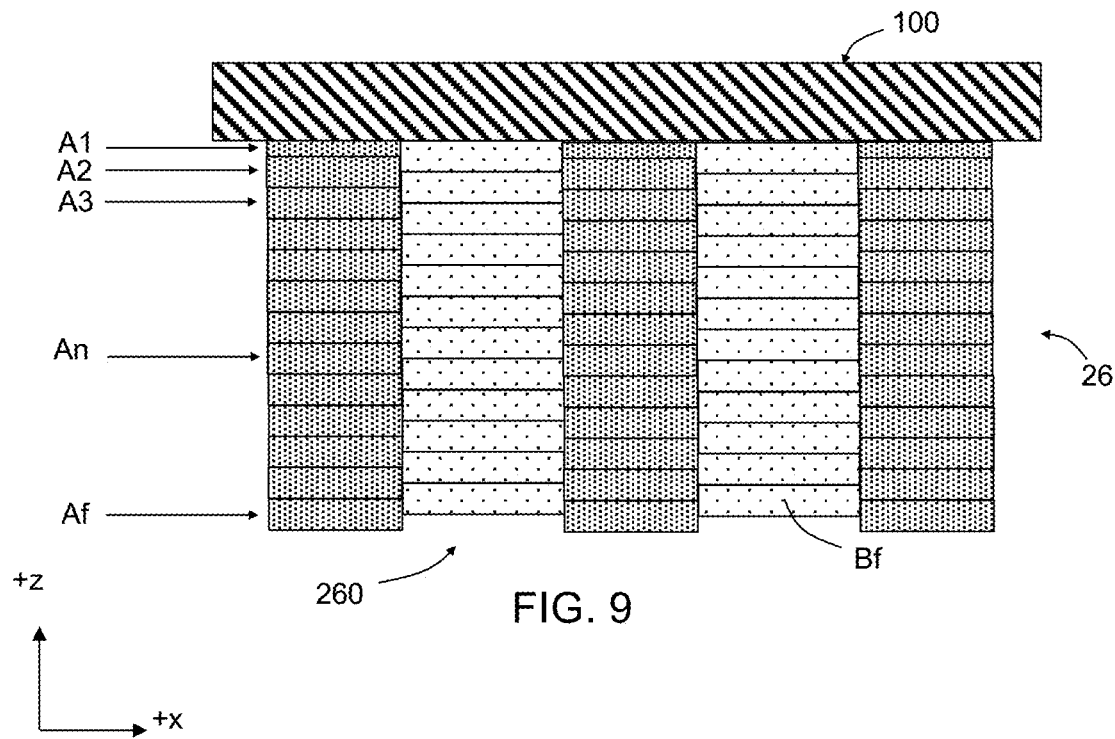
FIG. 9 is a side cross-section view of another part with f total layers formed according to the teachings of the present disclosure.
Figure 10:
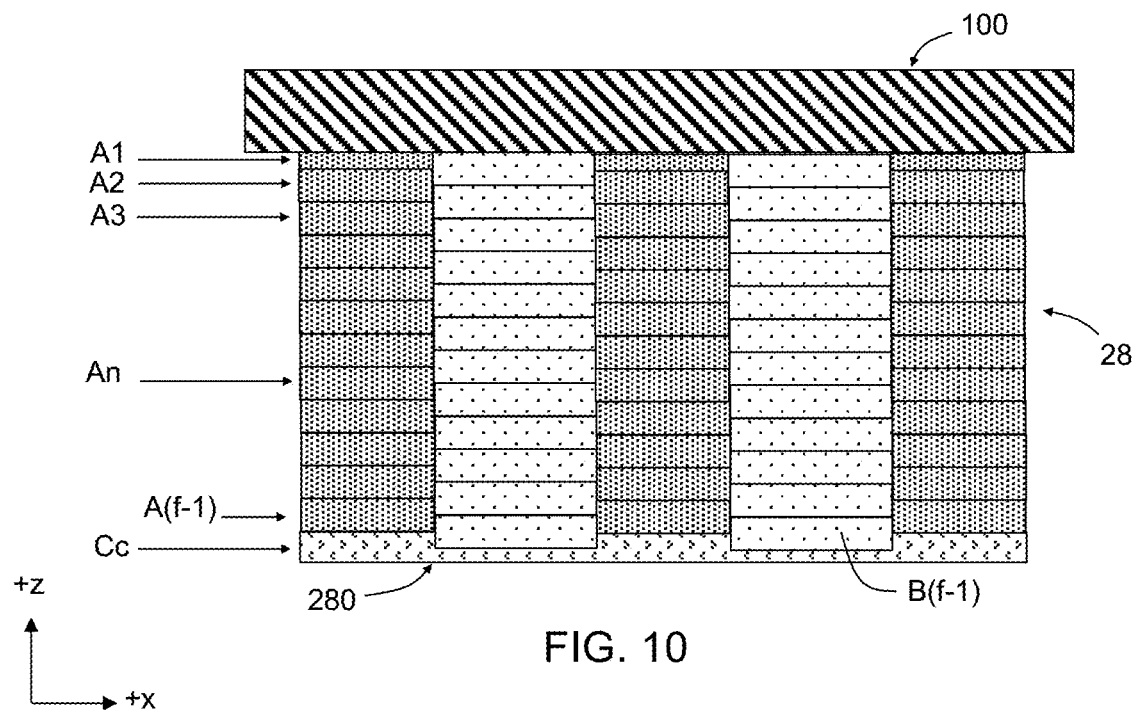
FIG. 10 is a side cross-section view of still another part with f total layers according to the teachings of the present disclosure.

Referring to FIGS. 9 and 10, another example of forming a part with a smooth or planar bottom surface is shown. Particularly, FIG. 9 shows a part 26 with three columns 264 having Af sections and two columns 266 having Bf sections offset from the Af sections. And as shown in FIG. 10, a cover layer 'Cc' of the third material M3 is formed across the first sections Af and the second sections Bf such that the lower surface 260 does not have a step or steps. In some variations the cover layer Cc is a transparent layer and/or a dielectric layer.

Figure 11:
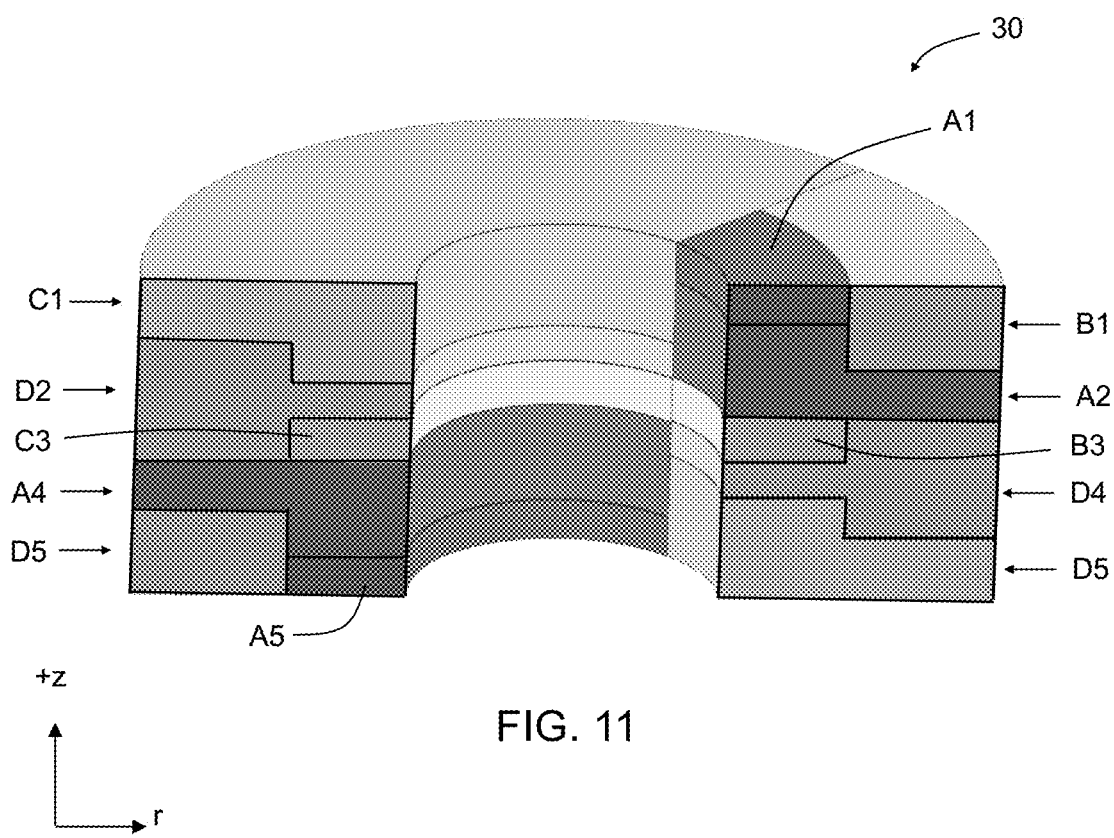
FIG. 11 is a side cross-section perspective view of the part in FIG. 10 with a cover layer according to the teachings of the present disclosure.

While FIGS. 3, 5, and 7-10 show parts with first sections A1-Af not overlapping second sections B1-Bf, it should be understood that the teachings of the present disclosure provide for forming VPP additive manufactured parts with more complex offset layer slicing. For example, and with reference to FIG. 11, a part 30 made from four materials with a more complex slicing layer configuration is shown. Particularly, the part 30 has an offset and spliced first layer with a first section A1 of the first material M1, a second section B1 of the second material M2, and a third section C1 of the third material M3. Next, an offset and sliced second layer includes a first section A2 formed on the first section A1 and the second section B1, and a fourth section D2 of a fourth material (not labeled) is formed on the third section C1. An offset and sliced third layer includes a second section B3 on the first section A2 and a third section C3 on the fourth section D2. Then an offset and sliced fourth layer includes a first section A4 on the fourth section D2 and the third section C3, and a fourth section D4 on the first section A2 and the second section B3. And an offset and sliced fifth layer includes a fourth section D5 and a first section A5 on the fourth section A4 and an another fourth section D5 on the fourth section D4.

Figure 12:
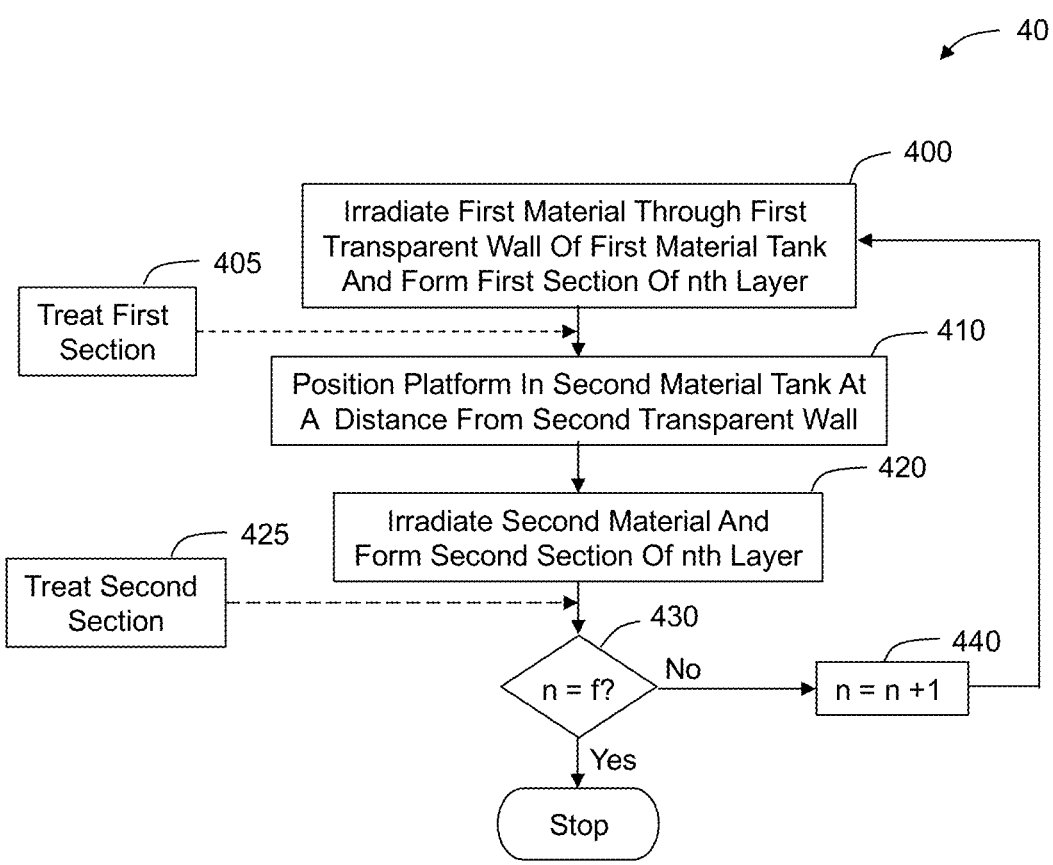
FIG. 12 is a flow chart for a method of forming a VPP additive manufactured part according to the teachings of the present disclosure.

Referring now to FIG. 12, a method 40 of forming a part according to the teachings of the present disclosure is shown. The method 40 includes irradiating a first material through a first transparent wall of a first material tank and forming a first section of an nth layer of the part on a platform at 400. As used herein, the term "nth layer" refers to one layer of a part having a predefined total number of layers and where n=1, 2, 3 . . . f, f equal to the predefined total number of layers. It should be understood that the platform is positioned in the first material tank with a gap between a lower surface of the platform and a first transparent wall of the first material tank.

After the first section of the nth layer is formed, the first section of the nth layer is positioned in a second material tank containing a second material at 410 with a distance between the first section of the nth layer and a second transparent wall of the second material tank. The second material is irradiated through the second transparent wall such that a second section of the nth layer is formed adjacent to the first section of the nth layer at 420.

In some variations, the first section of the nth layer is treated at 405 before being positioned in the second material tank at 410. Non-limiting examples of treating the first section (e.g., treating at least a lower surface of the first section) include washing, solvent spraying, solvent dunking, wiping, air drying, and blow drying, among others.

The method 40 proceeds to 430 where it is determined whether or not n of the nth layer is equal to f. In some variations, the second section of the nth layer is treated at 415 before (or after) the method 40 determines whether or not n of the nth layer is equal to f at 430.

If n for the nth layer equals f, then the method 40 stops. In the alternative, if n for the nth layer is less than f, the method 40 increments n by 1 at 440 and returns to 400 to repeat the 400-420 cycle. After n for the nth layer equals f, the method stops and the formed part is removed from the platform. In the alternative, or in addition to, the formed part is treated and/or a coating layer is formed over the nth first and second sections to provide an outer surface without a step or steps as described above.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of additive manufacturing a part via vat photopolymerization (VPP), the method comprising the steps of:
   a) irradiating a first material through a first transparent wall of a first material tank and forming a first section of an nth layer of the part on a platform, where n=1, 2, 3 . . . f and f=a predefined number of total layers greater than 1;

b) positioning the first section of the nth layer in a second material tank with a distance in a z-direction between the first section of the nth layer and a second transparent wall;

c) irradiating a second material and forming a second section of the nth layer of the part on the platform adjacent to and contacting the first section of the nth layer;

d) incrementing n by one and positioning the second section of the nth layer in the first material tank with another distance between the second section of the nth layer and the first transparent wall; and e) repeating steps a) through d) until n=f and the part having f layers is formed such that the second section of the nth layer extends in the z-direction further from the platform than the first section of the nth layer and such that the first section of the nth layer extends in the z-direction further from the platform than the second section of the (n−1)th layer for n>1, wherein one section among the first and second sections of a predetermined layer overlaps in a second direction with a different section of a preceding layer, the second direction being perpendicular to the z-direction.

2. The method according to claim 1, wherein the first section of the nth layer is positioned at least 10 μm from the second transparent wall during forming of the second section of the nth layer and the second section of the nth layer is positioned at least 10 μm from the first transparent wall during forming of the first section of the n+1 layer.

3. The method according to claim 1 further comprising at least one additional step, wherein the at least one additional step comprises at least one of treating the formed first section of the nth layer and a formed second section of the n−1 layer between steps b) and c) and treating the formed first section of the nth layer and the formed second section of the nth layer between steps d) and a), wherein treating formed first section and the formed second section comprises at least one of washing, solvent spraying, solvent dunking, wiping, air drying, and blow drying the formed first section and the formed second section.

4. The method according to claim 1, wherein the second material has at least one optical property different than the first material.

5. The method according to claim 4, wherein the first sections of the f layers have a first color and the second sections of the f layers have a second color different than the first color.

6. The method according to claim 5 further comprising forming a cover layer over the f layer of the part, wherein the cover layer is a transparent layer or a translucent layer.

7. The method according to claim 4, wherein the first sections of the f layers are transparent.

8. The method according to claim 7, wherein the part is a light pipe.

9. The method according to claim 1, wherein the second material has at least one mechanical property different than the first material.

10. The method according to claim 9, wherein the first sections of the f layers have a first elasticity and the second sections of the f layers have a second elasticity different than the first elasticity.

11. The method according to claim 1, wherein the first sections of the f layers have a first conductivity and the second sections of the f layers have a second conductivity different than the first conductivity.

12. The method according to claim 11, wherein the second sections of the f layers are a plurality of dielectric material sections.

13. The method according to claim 12, wherein the part is a capacitor.

14. The method according to claim 1, wherein:

irradiating the first material through the first transparent wall of the first material tank comprises forming two first sections of the nth layer spaced apart from each other; and irradiating the second material between the platform and the second transparent wall comprises forming the second section of the nth layer between the two first sections of the $n^{th}$ layer.

15. The method according to claim 14, wherein the second sections of the f layers are formed from a transparent material such that the part is light pipe.

16. A method of additive manufacturing a part vat photopolymerization, the method comprising the steps of:

a) irradiating a first material through a first transparent wall of a first material tank and forming a first section of an nth layer of the part on a platform, where n=1, 2, 3 . . . f and f=a predefined number of total layers greater than 1;

b) positioning the first section of the nth layer in a second material tank with a distance in a z-direction between the first section of the nth layer and a second transparent wall;

c) irradiating a second material and forming a second section of the nth layer of the part on the platform adjacent to the first section of the nth layer, wherein the second section of the nth layer has an outer surface offset from an outer surface of the first section of the nth layer;

d) incrementing n by one and positioning the second section of the nth layer in the first material tank with another distance between the second section of the nth layer and the first transparent wall; and e) repeating steps a) through d) until n=f and the part having f layers is formed such that the second section of the nth layer extends in the z-direction further from the platform than the first section of the nth layer and such that the first section of the nth layer extends in the z-direction further from the platform than the second section of the (n−1)th layer for n>1, wherein one section among the first and second sections of a predetermined layer overlaps in a second direction with a different section of a preceding layer, the second direction being perpendicular to the z-direction.

17. The method according to claim 16, wherein:

irradiating the first material through the first transparent wall of the first material tank comprises forming two first sections of the $n^{th}$ layer spaced apart from each other; and irradiating the second material between the platform and the second transparent wall comprises forming the second section of the $n^{th}$ layer between the two first sections of the $n^{th}$ layer.

18. The method according to claim 16, wherein the first material has at least one property different than the second material and the at least one property is at least one of an optical property, a physical property, and a mechanical property.

19. A method of additive manufacturing a part via digital light processing (DLP), the method comprising the steps of:

a) irradiating a first material through a first transparent wall of a first material tank and forming a first section of an nth layer of the part on a platform, where n=1, 2, 3 ... f and f=a predefined number of total layers greater than 1;

b) removing the first section of the nth layer from the first material tank and treating at least the first section of the nth layer;

c) positioning the platform with the first section of the nth layer in a second material tank with a distance in a z-direction between the first section of the nth layer and a second transparent wall;

d) irradiating a second material in the second material tank and forming a second section of the nth layer of the part on the platform adjacent to the first section of the nth layer, wherein the second section of the nth layer has an outer surface offset from an outer surface of the first section of the nth layer;

e) removing the second section of the layer from the second material tank and treating at least the second section of the layer; and f) incrementing n by one and positioning the platform with the second section of the nth layer in the first material tank with another distance between the second section of the nth layer and the first transparent wall; and g) repeating steps a) through f) until n=f and the part having f layers is formed such that the second section of the nth layer extends in the z-direction further from the platform than the first section of the nth layer and such that the first section of the nth layer extends in the z-direction further from the platform than the second section of the (n−1)th layer for n>1, wherein one section among the first and second sections of a predetermined layer overlaps in a second direction with a different section of a preceding layer, the second direction being perpendicular to the z-direction.

20. The method according to claim 19 wherein the first material has at least one property different than the second material and the at least one property is at least one of an optical property, a physical property, and a mechanical property.

* * * * *